Aug. 8, 1961 N. CORDIS 2,995,109
CONTINUOUS POULTRY FEEDER
Filed May 21, 1958 2 Sheets-Sheet 1
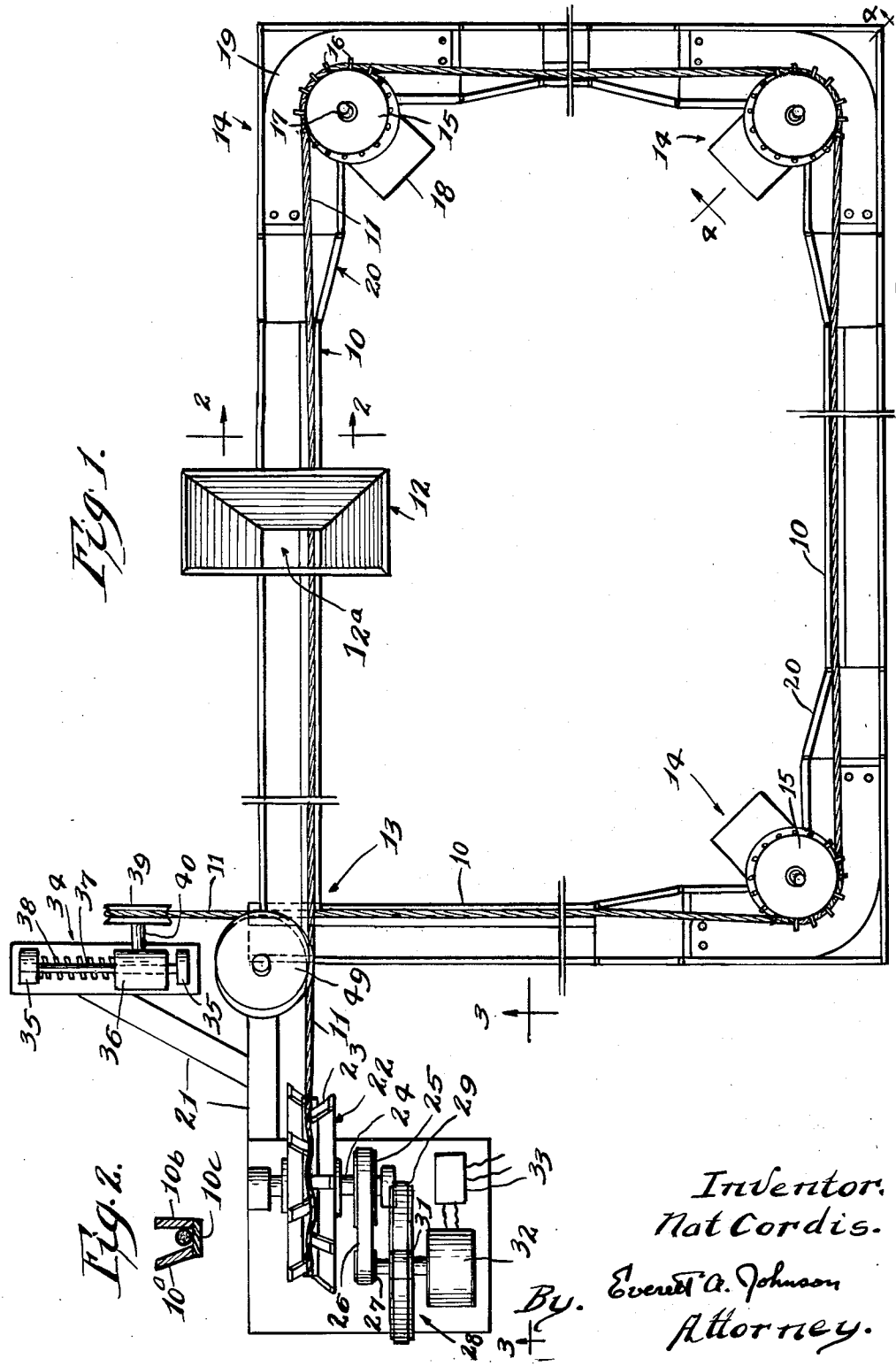
Inventor:
Nat Cordis.
By. Everett A. Johnson
Attorney.

Aug. 8, 1961 — N. CORDIS — 2,995,109
CONTINUOUS POULTRY FEEDER
Filed May 21, 1958 — 2 Sheets-Sheet 2
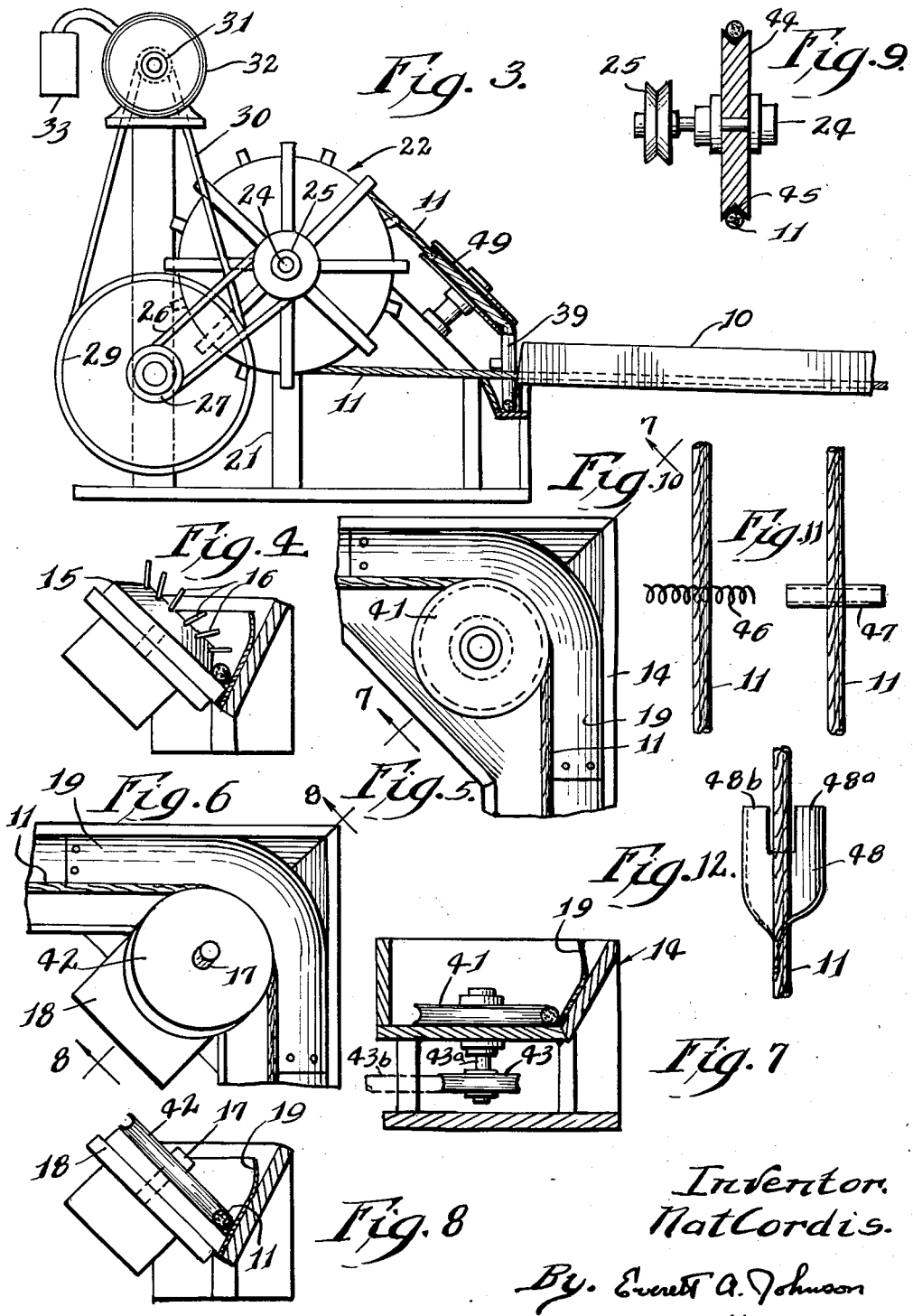
Inventor.
Nat Cordis.
By. Everett A. Johnson
Attorney.

United States Patent Office 2,995,109
Patented Aug. 8, 1961

2,995,109
CONTINUOUS POULTRY FEEDER
Nat Cordis, Crown Stock Farms, Silver Lake, Wis.
Filed May 21, 1958, Ser. No. 736,907
9 Claims. (Cl. 119—52)

This invention relates to conveyors for flowable solid materials and, more particularly, to a feeding device for distributing pulverant materials along an open-topped trough accessible to stock including poultry. More specifically, the invention is an improvement in a method and means for automatically distributing feed in a closed circuit trough-type poultry feeder.

The feeding of livestock, such as poultry, on a large scale necessarily involves much manual attention. Accordingly, a primary object of this invention is to provide a feeder of large capacity in which the feeding can be controlled with a minimum of attention by an operator. Another object is to provide a method and automatic means for uniformly distributing a supply of fresh feed within a continuous or closed circuit flock feeder. An additional object is to provide an automatic and controllable feeder which is silent in operation yet rugged and inexpensive in construction. A further object is to provide an apparatus which maintains a continuously renewed supply of feed in a continuous trough and minimizes the possibility of accumulating stale feed along the path of the conveyor. It is also an object of this invention to provide a conveyor mechanism which is quiet running, which requires a minimum of attention for maintenance of its mechanical components, and which does not tend to disturb the feeding poultry. Likewise, it is a further object to provide a system which can handle various types of feed and without tending to grind the feed within the trough.

A further important object is to provide an apparatus which is readily expandable for various sizes of flocks of poultry but which is also efficient for use in connection with relatively small flocks. A more specific object of the invention is to provide a flexible conveyor element which is of simple sturdy construction, is uniform in its feed conveying capacity, and is kink-proof. These and other objects of my invention will become apparent to those skilled in the art as the description thereof proceeds.

Briefly, this invention provides an improved poultry or stock feeder of the type wherein a feed conduit comprising an open-topped horizontal trough is arranged in communication with a feed supply hopper and wherein an endless flexible distributing means comprising a distributing strand, such as a cable, or rope, is moved longitudinally of the trough within a closed circuit. More particularly, according to this invention, the feed is distributed within the trough means by a continuous or endless flexible distributing strand which moves longitudinally along the bottom of the open-topped trough. The word "flights," as used hereinafter, has reference to the straight lengths of trough and to the lengths of the distributing strand means which runs within the same portion of the trough means. At intersecting "flights," corners are provided for directing the strands at about 90° angles. At the corners it is desired to change the direction of travel of the endless flexible distributing means in the presence of a minimum feed. Accordingly, the feed supply hopper may be placed at any convenient point, but ordinarily will be placed over a flight just beyond a corner so as to minimize any tendency of feed to accumulate within the corner.

It is also desired to drive the endless distributing means in a closed circuit and I have devised a positive drive means which is placed at one of the corners. The drive is of rugged construction, but has a minimum of moving parts. In traversing a corner, two flights of distributing strand are superposed in a cross-over whereby the feed being distributed is caused to discharge upon the strand emerging from the drive, such emerging strand being substantially free of feed.

Preferred forms of endless flexible distributor means is metal or vegetable filament cable or rope impervious to feed and which has a ribbed surface which will sweep the feed along the trough.

Stretch-resistant conveyor strands are preferred. However, a take-up can be provided by making one or more of the pulleys in the drive corner adjustable with respect to another pulley therein. Alternatively a weighted conveyor take-up may be provided. Likewise, a telescoped portion of two trough sections may be adjustably linked to change the length of the conveyor path in traveling through the trough circuit.

Details of my invention will be described by reference to particular embodiments thereof illustrated in the drawings wherein:

FIGURE 1 is a schematic plan view showing the general arrangement of a closed circuit feeder embodying the principles of my invention;

FIGURE 2 is a section through the trough taken at line 2—2 in FIGURE 1;

FIGURE 3 is an elevation of the drive corner taken along the line 3—3 in FIGURE 1;

FIGURE 4 is a section taken along the line 4—4 in Figure 1;

FIGURES 5 and 6 are plan views of other embodiments of idler corners adapted for use in the feeder of FIGURE 1;

FIGURES 7 and 8 are sections taken along line 7—7 and line 8—8 in FIGURES 5 and 6, respectively;

FIGURE 9 shows an alternative drive pulley; and

FIGURES 10, 11 and 12 show lengths of strand distributors provided with different forms of flexible feed impellers.

Referring to FIGURE 1, a stock feeder is shown having an open-topped trough 10, an endless flexible distributing or conveyor strand 11 in the trough and running on the bottom thereof, a supply hopper 12 from which feed discharges through part 12a onto the strand 11, drive means 13 for the strand 11, and idler corners 14 for guiding the strand 11 around the circuit of trough 10.

The feed conveyor strand 11 according to my invention comprises a plurality of filaments, such as fibers or wires helically interwound to form a flexible strand which is impervious to feed and has an irregular feed-carrying surface. The strand is substantially homogeneous along its length and may be of vegetable or synthetic fibers or metal wires. Manila or hemp rope and wire rope or cable such as airplane control cable are satisfactory.

The strand may be from about 0.125 to 0.75 inch with about 5/32 inch cable and ½ inch manila rope being typical examples.

The conveyor strand 11 is endless, made so by splicing, clamping connectors, etc., and is caused to travel through the trough 10 around the idler corners 14 by the power applied in the drive corner or station 13. The trough 10 may have the cross-section shown in FIGURE 2 and the idler corners 14 may be as shown in FIGURES 3, 5 and 7. A connector section 20 is provided at the inlet and outlet of the corners 14 to merge with the adjacent ends of the troughs 10.

The idler corners 14 include pulleys 15 (FIGURES 1, 3), 41 (FIGURES 5, 7) and 42 (FIGURES 6, 8) mounted on inclined pulley shaft 17. In FIGURES 1 and 3, the pulley 15 is provided with cable holddown pins 16 with the pulley shaft 17 inclined as shown in FIGURE 3. Two other forms of corner constructions are illustrated in FIGURES 5–8. However, each includes a curved corner baffle 19 and an angular frame 19a defining a non-linear trough section through which the strand 11 carries the feed.

In the embodiment of FIGURE 1, the conveyor 11 travels counterclockwise, picking up feed from the hopper 12 and then in series through the idler corners 14 and connecting flights of trough 10. Three of the flights of trough 10 are in substantially the same plane with the fourth or cross-over flight terminating at an elevated point in the drive corner 13. Thus, as shown in FIGURE 3, the entering flight of trough 10 and the strand 11 superpose the emerging strand 11 and any feed still carried by the entering strand 11 after making the circuit is dropped from the end of the entering trough section and deposited upon the emerging flight 11 in the lower section of the trough 10 to be recirculated. If desired an intercepting screen or separator may be interposed the entering and emerging strands to separate litter from the recirculated feed.

To operate the conveyor strand 11, there is provided a drive mechanism at corner 13 comprising a frame 21 on which is mounted traction drive wheel 22 having offset opposed spokes 22a with resilient traction pads 23 for engagement with the strand 11 as shown in FIGURES 1 and 3. The drive wheel 22 is driven through drive wheel shaft 24, drive pulley 25, drive pulley belt 26, and take-off pulley 27 which in turn is driven by belt transmission 28. The belt transmission 28, comprising transmission pulley 29 and transmission belt 30, is powered by motor pulley 31 driven by electric motor 32, the operation of which is controlled by a conventional manual switch (not shown) or timer 33.

The strand 11 leaves the cross-over section of trough 10 and passes under and over drive wheel 22 having its axis of rotation transverse to the longitudinal axis of the strand 11 moving through the cross-over section of trough 10. The strand 11 next passes under inclined idler pulley 49 making a 90° turn to take-up pulley 39 which carried by shaft 40 fixed to springloaded block 36. The block 36 is retracted by take-up spring 38 outwardly along the guide rod 37 and any slack in the strand 11 is taken up.

In FIGURE 9, I have illustrated another form of drive wherein the pulley 44 is provided with a resilient traction facing 45. The pulley 44 may be substituted for the drive wheel 22 on shaft 24. Further, one or more of the idler pulleys 15 may be provided with a drive pulley 43 on the pulley shaft 17. In that event, the contacting face or web of the particular idler pulley may be provided with a traction facing of rubber or the like.

The strand conveyor 11 may be provided, as shown in FIGURES 10, 11 and 12, with flexible feed impellers 46, 47 and 48. Each of these impellers is secured to the strand 11 by passing between the wires or fibers which comprise the strand 11. The impeller 46 comprises a coil spring, 47 is a length of flexible tubing, and 48 is a bifurcated strip interposed between the helically wound elements of the strand 11.

The foregoing description has been with respect to a closed circuit system wherein three idler corners are associated with a single drive corner. It is contemplated, however, that the principles of design incorporated herein may be utilized in a closed trough circuit which includes only a drive end and a turnaround end with conveyor flights running in parallel therebetween in the same trough.

This application is a continuation-in-part of my copending application Serial No. 409,177, filed February 9, 1954, now U.S. Patent 2,861,675 for continuous flexible conveyor poultry feeder having a feed-impervious conveyor.

Although my apparatus has been described in terms of particular embodiments thereof which have been set forth in considerable detail, it should be understood that this is by way of illustration only and that my invention is not limited thereto. Alternative constructions and operating techniques will become apparent to those skilled in the art in view of my disclosure and, accordingly, it is contemplated that modifications can be made without departing from the spirit of the described invention.

What I claim is:

1. A poultry feeding apparatus comprising an endless trough circuit in a substantially horizontal plane, said circuit having connected linear and non-linear portions, flexible endless feed-impervious strand means movable longitudinally within said trough means in substantially said horizontal plane, said strand comprising a plurality of filaments interwound helically around each other along a substantially common axis to form a feed-impervious strand having an irregular feed-carrying surface, means for supplying power to the strand to drive it through said trough means, and hopper means for supplying feed to be moved by the strand along the said trough means.

2. The poultry feeding apparatus of claim 1 which includes idler pulley means in non-linear portions of said circuit, said idler pulley being mounted for rotation on an axis inclined to the substantially horizontal plane of said trough circuit.

3. A stock feeder comprising an open-topped trough means in which a feed supply is provided, an endless continuous strand drawn through said trough means adjacent the bottom thereof, a plurality of corners, each of said corners including a housing arranged in alignment with two adjacent flights of trough, strand guide means in said corner in alignment with adjacent flights of said trough, said guide means including a pulley mounted for rotation about an axis arranged oblique to the longitudinal axis of adjacent flights of trough and to the plane of travel of the said strand therethrough, said pulley having means to hold said strand along the bottom of said corners, drive means including driven and idler pulley means exterior of said trough means, and a loop of conveyor strand trained about driven and idler pulley means in said drive means.

4. The stock feeder of claim 3 wherein the said driven pulley means includes conveyor take-up means.

5. A stock feeder comprising an open-topped trough means into which a feed supply is discharged, an endless continuous feed-impervious strand drawn through said trough means adjacent the bottom thereof, a plurality of idler corners, a drive corner, each of said corners including a housing arranged in alignment with two adjacent flights of trough, and a strand guide means in each of said corners in alignment with adjacent flights of said trough said guide means including a pulley having strand-engaging means and mounted on a pulley shaft which is inclined to the plane of travel of said strand in passing through a given corner, whereby said pulley guides the strand through adjacent trough sections and holds the strand along the bottom thereof.

6. In a poultry feeding apparatus the combination of a feeding trough means comprising an endless circuit in a substantially horizontal plane, flexible endless strand means movable within said trough means longitudinally therethrough, said strand comprising a plurality of filaments interwound helically around each other along a substantially common axis to form a feed-impervious strand having an irregular feed-carrying surface, means for supplying power to the strand to drive it through said trough means, and hopper means for supplying feed to be moved by the strand along the said trough means.

7. In a poultry feeding apparatus, the combination of a longitudinally extending feeding trough means, flexible endless strand means movable within said trough longitudinally thereof, guide means operatively engaging said strand within said trough, means for supplying power to the strand to drive it within said trough means, said guide means including a pulley mounted on an inclined pulley shaft, whereby said pulley guides the strand through adjacent trough sections and holds the strand along the bottom thereof, and means for supplying feed to be moved by the strand means along the feed trough means.

8. A flexible conveyor for use in the stock feeder of claim 3 wherein the conveyor travels along the bottom of a substantially V-shaped trough which conveyor comprises a plurality of filaments interwound helically around each other along a substantially common axis to form a feed-impervious strand having an irregular feed-carrying surface.

9. The conveyor of claim 1 which includes transverse, symmetrically arranged, flexible feed impellers passing through said strand between said filaments.

References Cited in the file of this patent

UNITED STATES PATENTS

| | | |
|---|---|---|
| 2,563,321 | Dugan | Aug. 7, 1951 |
| 2,640,462 | Doty et al. | June 2, 1952 |
| 2,738,765 | Hart | Mar. 20, 1956 |
| 2,794,421 | Rose et al. | June 4, 1957 |
| 2,861,675 | Cordis | Nov. 25, 1958 |